United States Patent
Leisten et al.

(10) Patent No.: US 6,690,336 B1
(45) Date of Patent: *Feb. 10, 2004

(54) ANTENNA

(75) Inventors: Oliver Paul Leisten, Northampton (GB); Ebinotambong Agboraw, Northampton (GB); George Nicolaidis, Northampton (GB)

(73) Assignee: Symmetricom, Inc.

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/333,844

(22) Filed: Jun. 15, 1999

(30) Foreign Application Priority Data

Jun. 16, 1998 (GB) ............................................... 9813002

(51) Int. Cl.⁷ ............................. H01Q 1/24; H01Q 1/36
(52) U.S. Cl. ....................................... 343/895; 343/702
(58) Field of Search ................................. 343/702, 895; H01Q 1/24

(56) References Cited

U.S. PATENT DOCUMENTS

| | | |
|---|---|---|
| 2,575,377 A | 11/1951 | Wohl |
| 2,763,003 A | 9/1956 | Harris |
| 3,611,198 A | 10/1971 | Ma |
| 3,633,210 A | 1/1972 | Westerman |
| 3,906,509 A | 9/1975 | DuHamel |
| 3,940,772 A | 2/1976 | Ben-dov |
| 4,008,478 A | 2/1977 | Ikarath et al. |
| 4,008,479 A | 2/1977 | Smith ................... 343/895 |
| 4,114,164 A | 9/1978 | Greiser |
| 4,148,030 A | 4/1979 | Foldes |

(List continued on next page.)

FOREIGN PATENT DOCUMENTS

| | | |
|---|---|---|
| DE | 3217437 A1 | 11/1983 |
| EP | 0 051 018 B1 | 7/1985 |
| EP | 0 198 578 A1 | 10/1986 |
| EP | 0 214 806 | 3/1987 |
| EP | 0 241 921 A1 | 10/1987 |
| EP | 0 320 404 | 6/1989 |
| EP | 0 332 139 | 9/1989 |
| EP | 0 429 255 A2 | 5/1991 |
| EP | 0 465 658 A1 | 1/1992 |
| EP | 0 469 741 | 2/1992 |

(List continued on next page.)

OTHER PUBLICATIONS

Nakano, H., "Helical and Spiral Antennas —A Numerical Approach", *Research Studies Press Ltd.*, England, pp. 1–261 (1987).

Krall et al., *IEEE Transactions on Antennas and Propagation*, vol. AP–27, No. 6, Nov. 1979, pp. 850–853.

Espaignol, J. et al., "Duplexeur A Resonateurs Dielectriques En Bande K", *6es Journees Nationales Microondes*, Montpellier, Jun. 21–23, 1989, Centre D'Electronique De Montpellier, pp. 321–322.

Primary Examiner—Michael C. Wimer
(74) Attorney, Agent, or Firm—Gray Cary Ware & Freidenrich, LLP

(57) ABSTRACT

A dielectric-loaded antenna having a plurality of radiating elements and a loop element plated on the surface of a cylindrical ceramic core has balanced and single-ended modes of resonance which are coupled together so as to define an operating frequency band. The two modes of resonance are associated with different respective radio frequency current patterns in the radiating elements, and the input reactance component of the load represented by the antenna at its feedpoint is substantially zero within the operating frequency band only when the corresponding input resistance component is finite and substantially nonzero.

27 Claims, 5 Drawing Sheets

U.S. PATENT DOCUMENTS

| | | |
|---|---|---|
| 4,160,979 A | 7/1979 | Drewett |
| 4,168,479 A | 9/1979 | Rubin |
| 4,204,212 A | 5/1980 | Sindoris et al. |
| 4,270,128 A | 5/1981 | Drewett |
| 4,323,900 A | 4/1982 | Krall et al. |
| 4,329,689 A | 5/1982 | Yee ............................ 343/700 |
| 4,349,824 A | 9/1982 | Harris |
| 4,442,438 A | 4/1984 | Siwiak et al. ................ 343/792 |
| 4,608,572 A | 8/1986 | Blakney et al. |
| 4,608,574 A | 8/1986 | Webster et al. |
| 4,697,192 A | 9/1987 | Hofer et al. |
| 4,706,049 A | 11/1987 | Dydyk |
| 4,862,184 A | 8/1989 | Ploussios |
| 4,902,992 A | 2/1990 | Rubin et al. |
| 4,910,481 A | 3/1990 | Sasaki et al. |
| 4,940,992 A | 7/1990 | Nguyen et al. |
| 4,980,694 A | 12/1990 | Hines |
| 5,019,829 A | 5/1991 | Heckman et al. |
| 5,023,866 A | 6/1991 | De Muro |
| 5,055,852 A | 10/1991 | Dusseux et al. ............. 343/725 |
| 5,081,469 A | 1/1992 | Bones ......................... 343/895 |
| 5,099,249 A | 3/1992 | Seavey |
| 5,134,422 A | 7/1992 | Auriol ......................... 343/895 |
| 5,170,176 A | 12/1992 | Yasunaga et al. |
| 5,170,493 A | 12/1992 | Roth |
| 5,255,005 A | 10/1993 | Terret et al. |
| 5,258,728 A | 11/1993 | Taniyoshi et al. |
| 5,281,934 A | 1/1994 | Shiau et al. |
| 5,298,910 A | 3/1994 | Takei et al. |
| 5,329,287 A | 7/1994 | Strickland ................... 343/752 |
| 5,341,149 A | 8/1994 | Valimaa et al. ............. 343/895 |
| 5,345,248 A | 9/1994 | Hwang et al. |
| 5,346,300 A | 9/1994 | Yamamoto et al. ......... 343/895 |
| 5,349,361 A | 9/1994 | Egashira et al. |
| 5,349,365 A | 9/1994 | Ow et al. .................... 343/895 |
| 5,406,296 A | 4/1995 | Egashira et al. |
| 5,406,693 A | 4/1995 | Egashira et al. |
| 5,450,093 A | 9/1995 | Kim |
| 5,479,180 A | 12/1995 | Lenzing et al. |
| 5,541,613 A | 7/1996 | Lam et al. ................ 343/792.5 |
| 5,548,255 A | 8/1996 | Spielman |
| 5,612,707 A | 3/1997 | Vaughan et al. ............ 343/895 |
| 5,748,154 A | 5/1998 | Yokota |
| 5,854,608 A | 12/1998 | Leisten |
| 5,859,621 A | 1/1999 | Leisten ........................ 343/895 |
| 5,945,963 A | 8/1999 | Leisten |
| 5,963,180 A | 10/1999 | Leisten |
| 6,005,521 A * | 12/1999 | Suguro et al. ............... 343/895 |
| 6,384,798 B1 * | 5/2002 | Barta et al. .................. 343/895 |

FOREIGN PATENT DOCUMENTS

| | | |
|---|---|---|
| EP | 0 521 511 | 1/1993 |
| EP | 0 588 271 | 3/1994 |
| EP | 0 588 465 A1 | 3/1994 |
| EP | 0 590 534 A1 | 4/1994 |
| EP | 0 652 645 | 5/1995 |
| EP | 0 777 293 | 6/1997 |
| EP | 0 791 978 | 8/1997 |
| FR | 2570546 A1 | 3/1986 |
| FR | 2603743 | 3/1988 |
| GB | 762415 | 11/1956 |
| GB | 840850 | 7/1960 |
| GB | 1198410 | 7/1970 |
| GB | 1 568 436 | 5/1980 |
| GB | 2196483 B | 4/1988 |
| GB | 2 202 380 A | 9/1988 |
| GB | 2 243 724 | 11/1991 |
| GB | 2 246 910 | 2/1992 |
| GB | 2 248 344 | 4/1992 |
| GB | 2 292 257 | 2/1996 |
| GB | 2 292 638 | 2/1996 |
| GB | 2 309 592 | 7/1997 |
| GB | 2 310 543 A | 8/1997 |
| GB | 2 311 675 | 10/1997 |
| GB | 2 317 057 A | 3/1998 |
| GB | 2 321 785 A | 8/1998 |
| GB | 2 326 532 A | 12/1998 |
| JP | 3274904 | 12/1991 |
| JP | 7-249973 | 9/1995 |
| JP | 8-8408 | 1/1996 |
| SU | 1483-511 | 5/1989 |
| WO | WO 91/11038 | 7/1991 |
| WO | WO 92/05602 | 4/1992 |
| WO | WO 92/17915 | 10/1992 |
| WO | WO 93/22804 | 11/1993 |
| WO | WO 94/21001 | 9/1994 |
| WO | WO 94/27338 | 11/1994 |
| WO | WO 96/06468 | 2/1996 |
| WO | WO 97/27642 | 7/1997 |
| WO | WO 97/37401 | 10/1997 |
| WO | WO 98/24144 | 6/1998 |

* cited by examiner

ANTENNA

FIELD OF THE INVENTION

This invention relates to an antenna for operation in excess of 200 MHz, and to a radio communication unit including the antenna.

BACKGROUND OF THE INVENTION

The antenna requirements of a cellular or cordless telephone handset are primarily that it should be compact and omnidirectional. For a handset operating within the frequency range of 800 MHz to 2 GHz the antenna is typically an extendible rod having a length approximately equivalent to a quarter wavelength when extended, or a helical wire having several turns. The antenna is usually mounted partly within the handset unit and partly projecting from the end of the unit adjacent the earphone. A disadvantage with small antennas such as those designed for personal telephone use is that, in general, they have poor gain over the frequency band in which they are required to operate. It is also known that small resonant antennas generally have a narrower fractional bandwidth than their larger counterparts designed to operate at lower frequencies. Another disadvantage is that, the smaller they are, the greater is their tendency to generate intense near-field electromagnetic radiation, i.e. radiation which is perceived to represent a health hazard when such an antenna is used close to the head for transmission of signals. The measurement of this effect is conducted to produce a parameter usually referred to as the Specific Absorption Rate (SAR).

The latter disadvantage has been addressed to some extent in the Applicant's co-pending British Patent Application No. 2309592, which discloses a twisted loop antenna exhibiting a radiation pattern with an azimuth null when oriented with the axis of the radiating helices upright. With appropriate mounting of the antenna on the housing of a portable telephone, this null can be directed towards the user's head to reduce irradiation in that direction.

It is an object of the invention to provide a small antenna which combines improved bandwidth with good SAR performance.

SUMMARY OF THE INVENTION

According to a first aspect of this invention, an antenna for operation at frequencies in excess of 200 MHz comprises: an insulative core of a solid material having a relative dielectric constant greater than 5' the outer surface of the core defining a volume the major part of which is occupied by the solid material; a feeder structure comprising a length of transmission line; an electrically conductive structure including a plurality of radiating elements connected to the transmission line at a first position, and a link element separately connecting the radiating elements to the transmission line at a second position, spaced from the first position along the feeder structure, the electrically conductive structure being disposed on or adjacent the outer surface of the core; wherein the core and conductive structure are configured such that the antenna has at least two different modes of resonance which are coupled thereby to define together an operating frequency band for signals fed to or received from the transmission line, the different modes of resonance being associated with different respective radio frequency (r.f.) current patterns in the conductive structure, each pattern including the said radiating elements.

The antenna may be configured such that (a) a first mode of resonance occurs at a first frequency within the said band and is associated with an r.f. current loop including the said antenna elements and beginning and ending at a location at which the antenna elements are connected to the transmission line at the first position, the link element acting as a high impedance blocking element at the first frequency, and such that (b) a second mode of resonance occurs at a second frequency within the said band and is associated with an r.f. current loop running from the location of the connection of the antenna elements to the transmission line at the first position, through the antenna elements and link element in series, to the connection with the feeder structure at the second position.

The antenna may further be configured so that the input reactance component of the load represented by the antenna is substantially zero within the operating frequency band only when the corresponding input resistance component is finite and substantially non-zero. The corresponding Smith chart representation of the load impedance presented by the antenna within the operating band is typically in the form of a looped self-intersecting locus.

In the preferred embodiment, there are two modes of resonance within a single operating band of the antenna, the first resonance being a balanced mode and the second mode of resonance being a single-ended mode. The antenna elements, the link element, in the form of a balun trap, and the transmission line all act as current-carrying elements in both modes of resonance. In this preferred embodiment, the core is cylindrical, having a central axis of symmetry, and the antenna elements are a plurality of axially co-extensive conductors extending between an end of the transmission line and the trap element. These antenna elements are the sole radiating elements, and the antenna has no other elements which act as significant radiating elements in either mode. Effectively, the antenna comprises a unitary structure with a unitary set of conductive elements which act together with both modes to yield two different structural modes of resonance.

It will be appreciated that such an antenna provides an improved operating bandwidth without using a large antenna structure or a plurality of separately fed antenna structures. The frequency responses associated with the respective modes couple together in the frequency domain so as to define the operating bandwidth.

By dimensioning the elements so that the two modes occur within a required band, e.g. the 1710 MHz to 1880 MHz DCS-1800 band for cellular telephones, or the 890 MHz to 965 Mhz European GSM band for cellular telephones, the whole of either of these bands can be accommodated with the bandwidth of the antenna, the two resonant modes coupling such that energy storage associated with one mode of resonance is shared with energy storage in the other mode of resonance, thereby forming a frequency response which is flat-topped or has a non-zero saddle between two resonant peaks. Typically, the modes of resonance are arranged to couple to achieve a combined gain characteristic for the antenna which maintains a response within the 3 dB limits over a fractional bandwidth of at least 3% of the centre frequency of the operating band.

In the preferred antenna in accordance with the invention, the radiating elements comprise a singe pair of elonaate antenna elements interconnected at respective ends by the link element so as to form a path of conductive material around the core with the other ends of the antenna elements constituting a feed connection at a distal end of the transmission line. The antenna elements are co-extensive, each element extending between axially spaced-apart positions on the outer cylindrical surface of the core. The elements may be metallised tracks deposited or bonded onto the core and arranged such that at each of the spaced-apart positions the respective spaced-apart portions of the elements are substantially diametrically opposed. The spaced apart portions all lie substantially in a single plane containing the central axis of the core, and the portions at one of the spaced-apart positions are connected together by the link element to form the loop, the portions at the other of the spaced-apart positions being coupled to feed connections for the loop by cross elements extending generally radially on an end face of the core. The antenna elements are preferably of equal length and are helical, each executing a half-turn around the core between the spaced-apart portions. The feed connections may be connected to a coaxial feeder which forms the transmission line extending through the core on the axis. The other end face of the core is metallised, the resulting conductive layer forming part of the link element.

Where the transmission line emerges at this other end face of the core the coaxial outer (the screen) is electrically connected to the conductive layer, and the line forms a termination for the antenna. It is at this termination that the insertion loss and reflection coefficients can be measured to determine the bandwidth and load parameters referred to above.

The antenna is also extremely compact, for example, an antenna for operation in the DCS 1800 band of 1710 MHz to 1880 MHz typically has a cylindrical core with an axial length of 12.1 mm and a diameter of 10 mm, using a core material having a relative dielectric constant of about 36.5 or higher.

According to a second aspect of the invention, there is provided a handheld radio communication unit having a radio transceiver, an integral earphone for directing sound energy from an inner face of the unit which, in use, is placed against the user's ear, and an antenna as described above coupled to the transceiver, wherein the antenna has a central axis and the said first and second positions on the transmission line are spaced apart along the axis, and wherein the antenna, over at least part of the operating frequency band, has a radiation pattern which, in a plane passing through the core normally to the axis, is substantially omnidirectional with the exception of a null, the antenna being mounted so that the axis of the antenna is generally parallel to the said inner face of unit and with the null directed generally perpendicularly to the inner face of the unit and, in use of the unit, towards the user's head.

With regard to orientation, in the case of the antenna core being in the form of a cylinder, (which may be drum- or rod-shaped) with a pair of co-extensive antenna elements the ends of which lie in a plane containing the central axis of the core, the plane is preferably parallel to the inner face of the unit. Providing the antenna with a trap element or balun in the form of a metallised sleeve not only allows the antenna loop to be fed in a substantially balanced condition, but also reduces the effect of the comparatively small ground mass represented by the communication unit. In addition, it provides a useful surface area for secure mounting of the antenna, e.g. by soldering or clamping.

For reasons of physical and electrical stability, the material of the core is advantageously ceramic, e.g. a microwave ceramic material such as a zirconium-titanate-based material, magnesium calcium titanate, barium zirconium tantalate, and barium neodymium titanate, or a combination of these. The preferred relative dielectric constant ($\in_r$) is upwards of 10 or, indeed, upwards of 20, 36, with a figure of 80 being attainable using a barium titanate material. Such materials have negligible dielectric loss to the extent that the Q of the antenna is governed more by the electrical resistance of the antenna elements than core loss.

In the preferred antenna, the antenna elements are fed from a distal end, the core having a central passage housing a coaxial feeder structure extending from a proximal or mounting end of the core and opening out at the distal end where radial elements couple the antenna elements on the cylindrical outer surface of the core respectively to the inner and outer conductors of the feeder structure. The link conductor may then be annular, and advantageously is constituted by a cylindrical sleeve on the outer surface of the proximal part of the core.

According to a third aspect of the invention, there is provided a handheld radio communication unit having a radio transceiver and an antenna as described above, the antenna being coupled to the transceiver, wherein the transceiver has a transmitting band portion and a receiving band portion which are different but adjacent each other within the said operating frequency band of then antenna.

The invention is described below by way of example with reference to the drawings.

DETAILED DESCRIPTION OF THE PREFERRED EMBODIMENT

Figure 1:
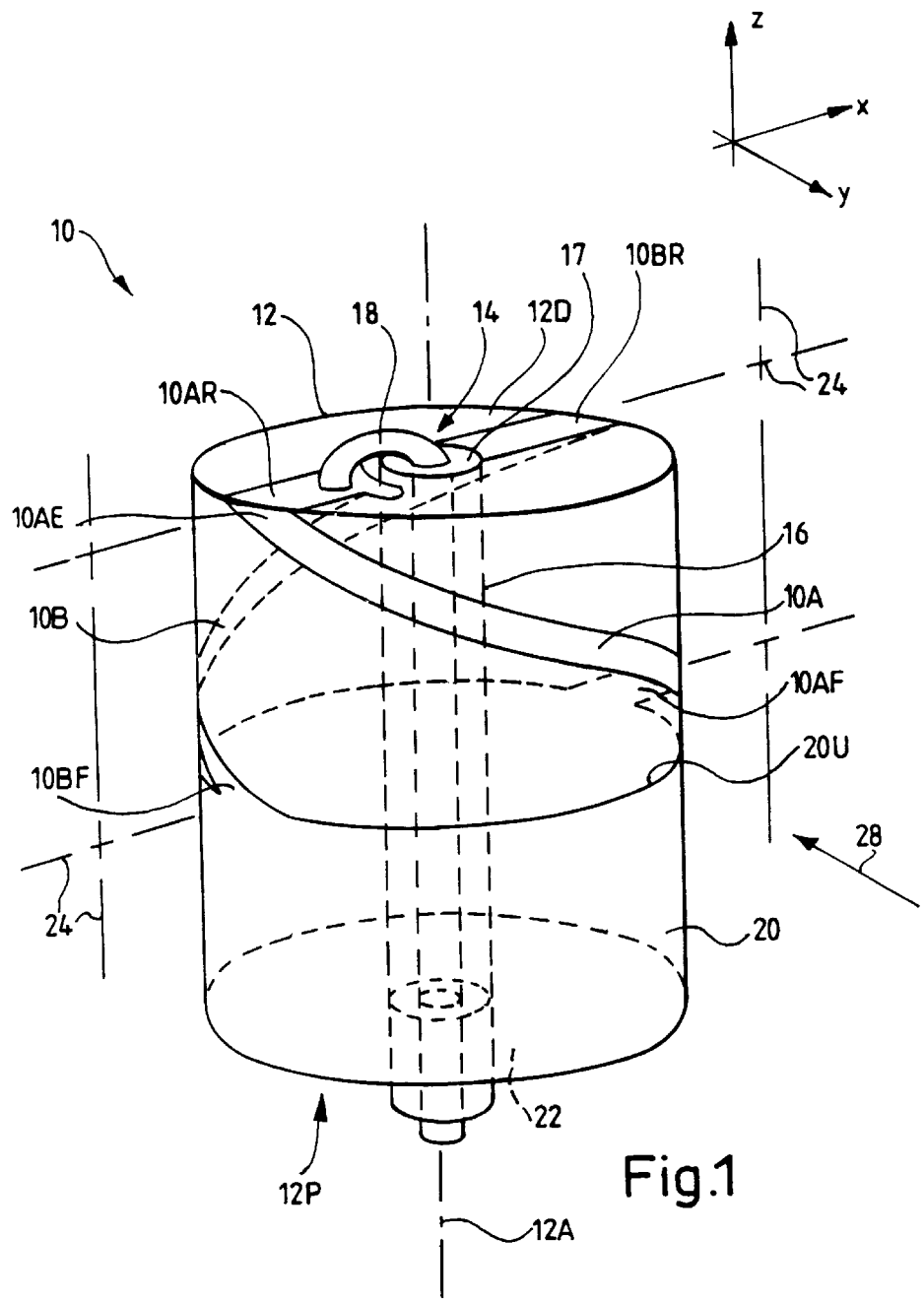
FIG. 1 is a perspective view of an antenna in accordance with the invention.
Figure 6A:
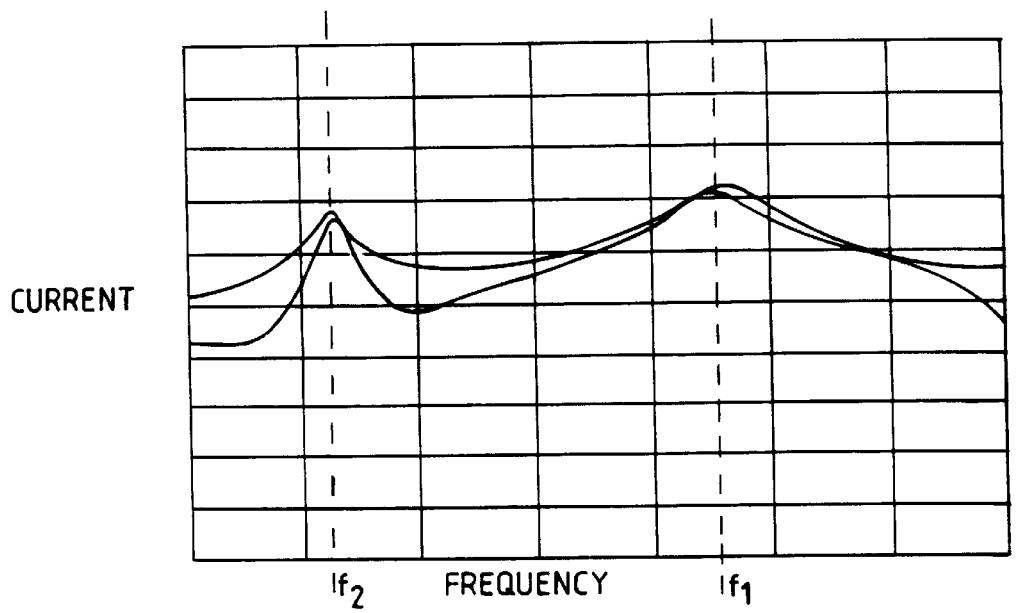
FIGS. 6A and 6B are graphs showing respectivbely the magnitude and phase of r.f. currents in the radiating elements of the antenna with respect to frequency.
Figure 6B:
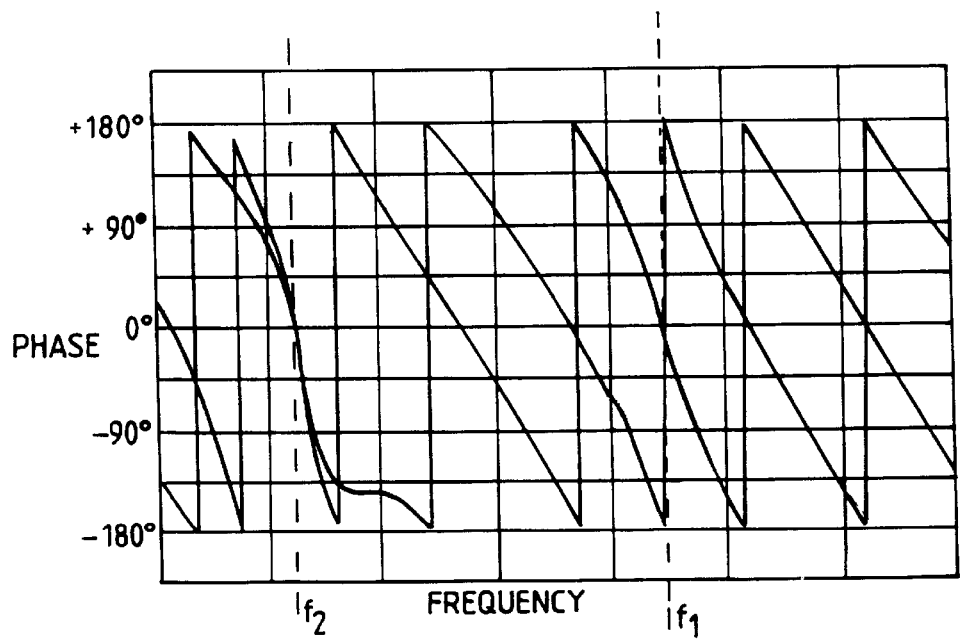

Referring to FIG. 1, an antenna 10 in accordance with the invention has an antenna element structure with two longitudinally extending radiating antenna elements 10A, 10B formed as metallic conductor tracks on the cylindrical outer surface of a ceramic core 12. In this context, "radiating element" means an element which, if the antenna is used for transmission, radiates energy to space. Such an element, when used for receiving signals, receives energy from space in a reciprocal way. The core 12 has an axial passage 14 with an inner metallic lining 16, and the passage houses an axial inner feeder conductor 18. The inner conductor 18 and the lining in this case form a transmission line feeder structure for coupling a feed line to the antenna elements 10A, 10B at a feed position on the distal end face 12D of the core. The antenna element structure also includes corresponding radial antenna elements 10AR, 10BR formed as metallic tracks on the distal end face 12D connecting diametrically opposed ends 10AE, 10BE of the respective longitudinally extending elements 10A, 10B to the feeder structure. The other ends of the antenna elements are also diametrically opposed and are linked by an annular common virtual ground conductor 20 in the form of a plated sleeve surrounding a proximal end portion of the core 12. This sleeve 20 is in FIGS. 6A and 6B are graphs showing respectively the magnitude and phase of r.f. turn connected to the lining 16 of the axial passage 14 by plating on the proximal end face 12D of the core 12.

In this preferred embodiment, the conductive sleeve 20 covers a proximal portion of the antenna core 12, thereby surrounding the feeder structure 16, 18, the material of the core 12 filling the whole of the space between the sleeve 12 and the metallic lining 16 of the axial passage 14. At any given transverse cross-section through the antenna, the antenna elements 10A, 10B are substantially diametrically opposed, and the proximal ends 10AF, 10BF of the antenna element branches are also substantially diametrically opposed where they meet the rim of the sleeve. The longitudinal extending elements are of equal length, each being in the form of a simple helix executing a half turn around the axis of the core 12.

The metallic sleeve 20 forms a cyiinder connected to the lining 16 by the plating 22 of the proximal end face 12P of the core 12, the combination of the sleeve 20 and plating 22 forming a balun so that, at or near a first predetermined frequency, signals in the transmission line formed by the feeder structure 16, 18 are converted between an unbalanced state at the proximal end of the antenna and a balanced state at an axial position approximately in the plane of the upper edge 20U of the sleeve 20. To achieve this effect, the axial length of the sleeve 20 is such that in the presence of an underlying core material of relatively high dielectric constant, the balun has an electrical length of about $\lambda/4$ at the predetermined frequency. Since the core material of the antenna has a foreshortening effect, the annular space surrounding the inner conductor 18 is filled with an insulating dielectric material 17 having a relatively small dielectric constant, and the feeder structure distally of the sleeve 20 has a short electric length. As a result, signals at the distal end of the feeder structure 16, 18 are at least approximately balanced and the antenna is considered to operate in a so-called balanced mode of resonance at the predetermined frequency.

A further effect of the sleeve 20 is that for signals in the region of the first predetermined frequency, the rim 20U of the sleeve 20 is effectively isolated from the ground represented by the outer conductor of the feeder structure. This means that currents circulating between the antenna elements 10A, 10B are confined to the rim 20U and the loop formed by the antenna elements are isolated. The sleeve thus acts as an isolating trap.

The antenna elements 10A, 10B are connected respectively to the inner conductor 18 and outer lining 16 of the feeder structure by their respective radial elements. It will be seen, then, that the helical elements, the radial elements 10A, 10B and the sleeve 20 together form a conductive loop on the outer surface of the core 12, the loop being fed at the distal end of the core by a feeder structure which extends through the core from the proximal end and lies between the antenna elements 10A, 10B. The antenna consequently has an end-fed bifilar helical structure.

It will be noted that the four ends of the antenna elements 10AE, 10AF, 10BE, 10BF all lie in a common plane containing the axis 12A of the core 12. The common plane is indicated by the chain lines in FIG. 1. The feed connection to the antenna element structure also lies in the common plane 24. The antenna element structure is so configured that in a balanced mode the resonance the integral of currents induced in the elemental segments of this structure by a wave incident on the antenna from a direction 28 normal to the plane 24 and having a planar wavefront, sums to zero at the feed position, i.e. where the feeder structure 16, 18 is connected to the antenna element structure. In practice, the two elements 10A, 10B are equally disposed and weighted on either side of the plane, yielding vectorial symmetry about the plane. Each element 10A, 10B may be regarded as being made up of a plurality of increments, each one of which lies diametrically opposite a corresponding complementary increment of the other of the elements 10A, 10B at an equal distance from the central axis 12A.

It should be understood that as well as exhibiting a balanced mode of resonance an antenna as described above also generally exhibits a single-ended mode of resonance at a different frequency. By arranging for the respective frequencies of the two modes to be close to each other, the modes can be made to couple, thereby yielding an antenna which radiates over a wider bandwidth than the bandwidth corresponding to either of the individual resonances.

Figure 2:
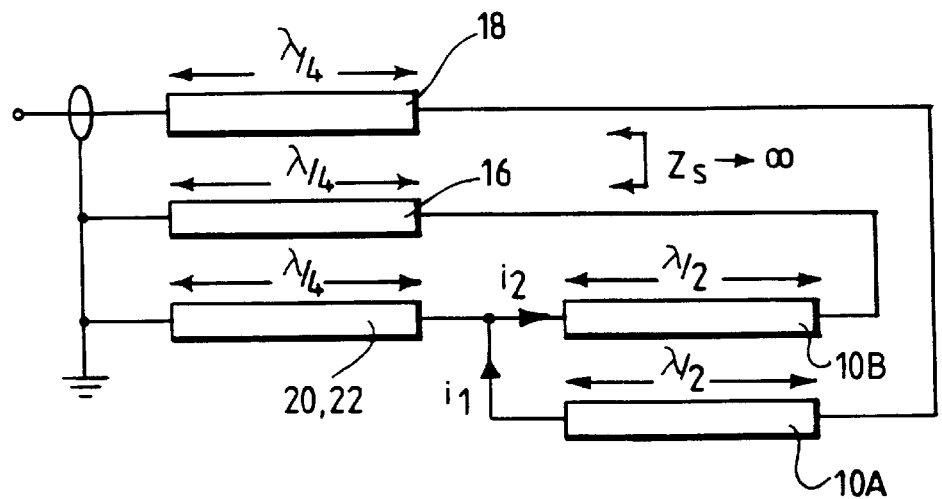
FIG. 2 is an equivalent circuit diagram representing the antenna in a balanced mode of resonance.
Figure 3:
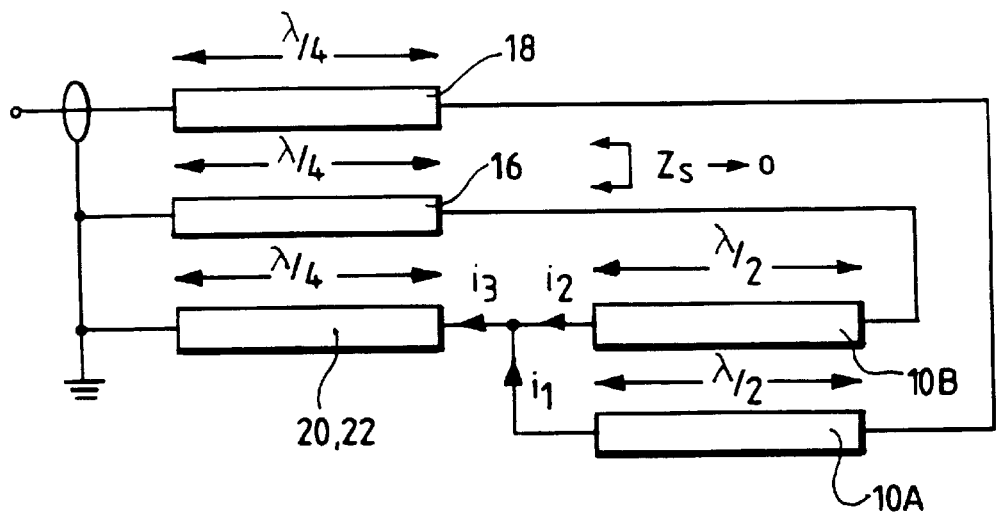
FIG. 3 is an equivalent circuit diagram representing the antenna in a single-ended mode of resonance.

Equivalent circuit diagrams representing the antenna element structure and characteristic operation in the balanced and single-ended modes of resonance are shown in FIGS. 2 and 3 respectively.

As FIG. 2 shows, when considering the operation of the antenna in the balanced mode of resonance the two antenna elements 10A, 10B may be represented by a transmission line section of an electrical length which is at least approximately $\lambda/2$ (or $(2n+1)\lambda/2$) where $\lambda$ is the centre wavelength of the antenna operating in the balanced mode, and n=0, 1, 2, 3 . . . The sleeve 20 and the plated end face 22 of the core can be represented by a similar transmission line section due to the presence of the core material of a relatively high relative dielectric constant within the sleeve 20 having a predetermined axial length. This has an electrical length between the elements 10A, 10B and the feeder structure of $\lambda/4$. The inner metallic lining 16 of the axial passage and the inner feeder structure are likewise represented by transmission line sections with an electrical length of $\lambda/4$ as a result of the foreshortening effect of the feeder dielectric material 17.

When operating at frequencies associated with the single-ended mode of resonance, the sleeve 20 and plated end face 22, the antenna elements 10A, 10B, and the feeder structure 16, 18 may be represented by their respective electrical lengths $l_1$, $l_2$ and $l_3$, as shown in FIG. 3. When operating in the single-ended mode the combined electrical path length $(l_1+l_2+l_3)$, i.e. the electrical length of the conductive path including the inner metalic lining 16 of the axial passage, the antenna element 10B, and the combination of the sleeve 20 and the plated end face of the core 22, is approximately equal to $\lambda$ (or n $\lambda$, where n=1, 2, 3 . . . ), whilst the electrical length $l_1$ of the combination of the sleeve 20 and plated end face 22 of the core is approximately $\lambda/4$ (or n $\lambda/4$ where n=1, 2, 3 . . . ). Here, x is the centre wavelength associated with the single-ended mode of resonance.

Referring to FIG. 2, when the antenna is operating at frequencies associated with the balanced mode of operation, the isolating effect of the sleeve 20 confines currents mainly to the rim 20U of the sleeve, this point representing a location of current maxima. By arranging for the balun length from the rim 20U of the sleeve to the feeder structure at the proximal end face 22 to be 90°, the balun acts as a current-to-voltage transformer so that the impedance $Z_L$ looking into the sleeve tends to infinity, as does the impedance at the distal end of the feeder structure, as indicated in FIG. 2. Consequently, current flows from the inner conductor 18, through the first element 10A and around the rim 20U to the second element 10B, through the second element 20B to the outer conductor 16 of the feeder structure, the total path length around this loop being 360°. As such, at any given point in time, the amplitude of currents $I_1$, $I_2$, in diametrically opposed portions of the antenna elements 10A, 10B are equal and opposite and, therefore, sum to zero at the distal end of the feeder structure i.e. where the feeder structure is connected to the antenna element structure. When considered in isolation (i.e. when not coupled with other modes), the balanced mode of resonance produces an electric field in the form of a dipole which is oriented transversely to the central axis of symmetry 12A of the core 12.

The presence of different current patterns in the conductive structure due to the different modes of resonance, and in particular the differing current paths in the radiating elements, may be observed in practice by applying pairs of r.f. voltage probes to the radiating elements at spaced apart positions on the radiating elements, preferably adjacent current maxima such as a short distance above the rim 20U on the radiating elements 10A and 10B. To measure the r.f. current in 10A, for instance, probes may be applied at the junction 10AF of the element 10A with the rim 20U and a short distance along the element 10A from that point. The observed voltage drop between the probes is indicative of the current.

An illustration of the magnitudes and relative phases of the currents in the elements 10A and 10B appears in FIGS. 6A and 6B respectively. In FIG. 6A, two network analyser traces are shown, one for the voltage drop on element 10A, and one for the voltage drop on element 10B, over a range of frequencies. Two peaks can be seen in each trace. These correspond to the resonant frequencies $f_1$ and $f_2$ associated with the balanced and single-ended modes respectively.

Referring to FIG. 6B, it will be seen that at $f_1$ the two traces indicate a phase difference of 180° between the two currents, whereas at $f_2$ the currents are in phase, as would be expected from the polarity of the currents $I_1$ and $I_2$ in the two modes as described above with reference to FIGS. 2 and 3.

Referring to FIG. 3, at the frequency associated with the single-ended mode of resonance, the sleeve 20 no longer has a significant isolating effect and the impedance $Z_L$ looking into the sleeve tends to zero. Therefore the currents $I_1$, $I_2$ through the elements 10A, 10B sum together at the rim 20U of the sleeve 20 to produce a combined current $I_3$ through the sleeve to the outer conductor of the feeder structure. The sleeve 20 may be connected to a ground plane, e.g. on a mobile communication unit, and so the summed currents may flow through sleeve 20 to ground.

When considered in isolation, the single-ended mode of resonance produces an electric field in the form of a dipole, which is oriented generally parallel to the central axis of symmetry of the core.

Figure 4A:
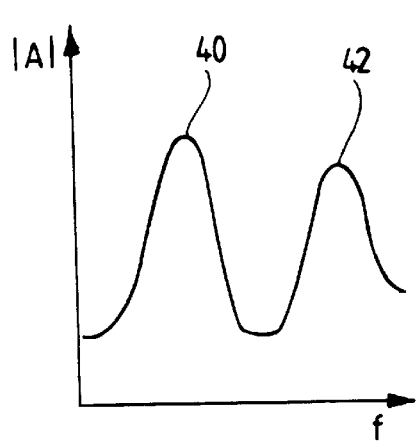
FIG. 4A is a diagram showing the variation of antenna gain with frequency due to separate modes of resonance.

In the general case, the single-ended mode is associated with different frequencies than is the balanced mode and produces its own resonant peak in the antenna gain characteristic. The individual peaks of resonance for this general case are shown in FIG. 4A. Resonant peak 40 indicates a frequency response of the antenna associated with the single-ended mode of resonance, and resonant peak 42 indicates a frequency response associated with the balanced mode of resonance.

Figure 4B:
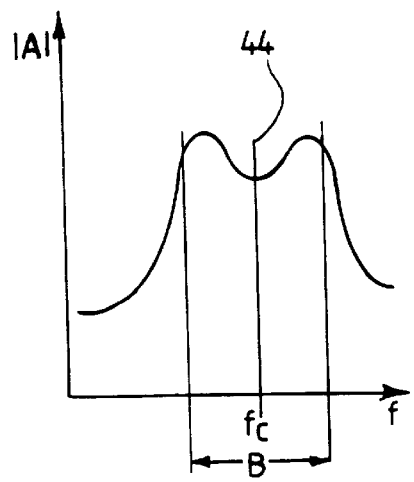
FIG. 4B is a diagram showing the variation of antenna gain with frequency of the antenna of FIG. 1 with coupled modes of resonance.

If, now, the dimensions of the antenna 10 are arranged such that the individual frequency responses associated with the balanced and single-ended modes of operation are caused to move together and couple in the frequency domain so that energy is shared between them, the antenna has a significantly wider overall operating bandwidth. It should be appreciated that the operating bandwidth of the antenna 10 is not defined by the antenna simply exhibiting a plurality of separate, closely situated resonant frequency responses. The two resonant modes couple to create an return loss characteristic the envelope of which comprises a coupled transition region associated with a certain antenna gain, the gain indicating the storage of energy in the antenna due to both modes of operation. This frequency domain coupling of the two modes of operation is clearly shown in FIG. 4B. A shallow 'saddle' region 44 exists between resonant peaks corresponding to the respective modes.

It should be noted that the modes of resonance of the antenna are of differing types. In other words, the operating bandwidth is not defined by simply arranging for a plurality of resonant modes of the same type (e.g. a plurality of balanced mode resonances) to be situated at adjacent frequencies so as to be coupled. Here, the different modes, in this preferred case the balanced and single-ended modes of resonance, are characterised by the different overall conducting paths through which the r.f. current flows over part of the antennas conductive structure. Each respective current pattern however, makes use of common radiating elements, here both of the helical elements 10A, 10B.

Preferably, the antenna dimensions are arranged such that the antenna exhibits a usable fractional bandwidth of at least 0.03 (3%), wherein the fractional bandwidth is defined as the ratio of the width of the operating band B to the centre frequency $f_c$ of the band, the return loss of the antenna within the band being at least 3 dB less than the average return loss outside the band. The return loss is defined as $20\log_{10}(V_r/V_i)$ where $V_r$ and $V_i$ are the magnitudes of the reflected and incident r.f. voltages at a feed termination of the feeder structure.

It will be understood that for the gain of an antenna, there is an associated variation in return loss related to the energy reflected at the antenna termination or single port. As the return loss changes with frequency, there is an associated change in the reactance and resistance of the load represented by the antenna, and thus in the ability to provide an impedance match. The antenna 10 is matchable over a bandwidth, as is evident when the complex load impedance is plotted on a normalised reflection coefficient diagram (often referred to as a Smith chart). The Smith chart provides a diagrammatic representation of the range of impedances over which the antenna can be matched, as indicated by a polar impedance locus. The Smith chart representation of the preferred antenna appears in FIG. 5, the resistive component tending to infinity at the right hand end of the chart.

Figure 5:
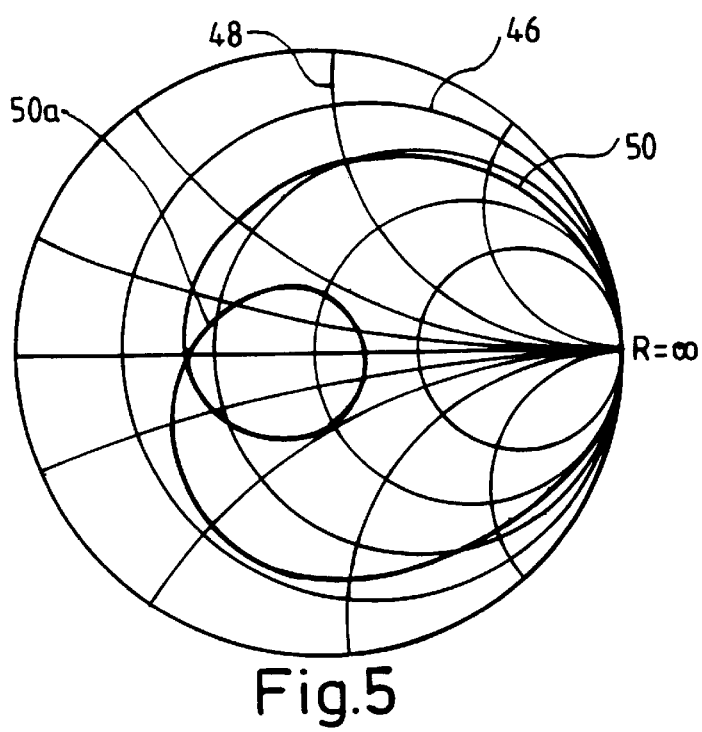
FIG. 5 is a Smith chart representation of the antenna.

The locus 50 for the present antenna, with coupled modes of resonance over a predetermined band of operation has an inner loop 50a encircling the centre of the chart (corresponding to a source impedance of 50 ohms), the locus self-intersecting once along its path, as indicated by the locus portion 50a in FIG. 5. This intersecting region and the inner loop correspond to the return loss indicated by the 'shallow' saddle region 44 of FIG. 4B which occurs within the antenna's operating bandwidth. As such, the input reactance component (X) of the load represented by the antenna (the lines 48 being cirlces of constant reactance) only approaches zero within the operating frequency band when the corresponding input resistance i as indicated by the circies 46) is neither zero nor infinity.

By considering the radiation pattern of the antenna solely for the balanced mode of resonance, the antenna element structure with half-turn helical elements 10A, 10B performs in a manner similar to a simple planar loop, having nulls in its radiation pattern in a direction transverse to the axis 12A and perpendicular to the plane 24. Since the operating band of the antenna is defined by a plurality of coupled resonances, the above radiation pattern and the generally toroidal radiation pattern (with nulls in a direction parallel to the axis 12A) associated with the single-ended mode procude an overall radiation pattern which is a hybrid of these two patterns. As such, the hybrid pattern depends on the dimensions and physical characteristics of the materials forming the antenna structure.

The reactance fields in the near-field region around the antenna, associated with the hybrid radiation pattern are able to achieve good SAR performance.

Figure 7:
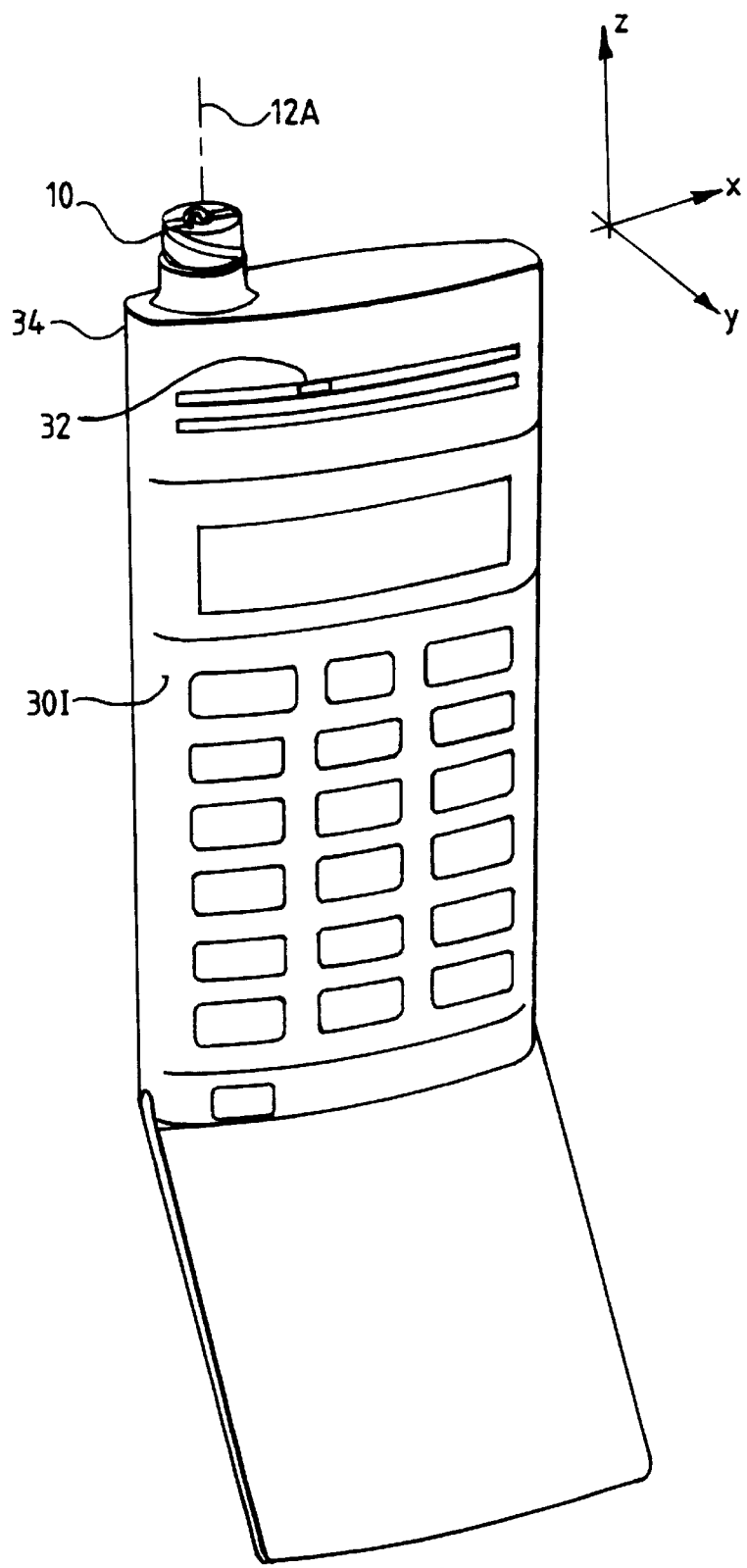
FIG. 7 is a perspective view of a telephone handset incorporating an antenna in accordance with the invention.

The antenna has particular application at frequencies above 200 MHz. The radiation pattern is such that the antenna lends itself especially to use in a handheld communication unit such as a cellular or cordless telephone handset, as shown in FIG. 7. With regard to the orientation of the antenna, it is mounted such that its central axis 12A (see FIG. 7) and the plane 24 (see FIG. 1) are parallel to the inner face 30I of the handset, (specifically the inner face 30I in the region of the earphone 32) and that the radial element 10AR which is connected to the inner feeder conductor 18 is oriented towards the edge 34 of the handset, i.e. with the helical element 10A connected to the inner feeder conductor 18 located on a portion of the core surface which is directed in the same direction as the inner face 30I of the handset. The axis 12A also runs longitudinally in the handset 30, as shown in FIG. 6. Again, the relative orientations of the antenna, and the handset 30 are evident by comparing the axis system X, Y, Z as it is shown in FIG. 1 with the representations of the axis system in FIG. 7.

The preferred material for the core 12 of the antenna is a zirconium-titanate-based material. This material has a relative dielectric constant of about 36 and is noted also for its dimensional and electrical stability with varying temperature. Dielectric loss is negligible. The core may be produced by extrusion, pressing or moulding.

The antenna elements 10A, 10B, 10AR, 10BR are metallic conductor tracks bonded to the outer cylindrical and distal end surfaces of the core 12, each track being of a width of at least four times its thickness over its operating length. In this embodiment, the antenna element tracks are approximately 30 thousandth of an inch in thickness, and the loop resistance of the antenna, comprising the combination of both radiation loss and dissipation loss is approximately 3.2Ω. The tracks may be formed by initially plating the surfaces of the core 12 with a metallic layer and then selectively etching away the layer to expose the core according to a pattern applied in a photosensitive layer similar to that used for etching printed circuit boards. Alternatively, the metallic material may be applied by selective deposition or by printing techniques. In all cases, the formation of the tracks as an integral layer on the outside of a dimensionally stable core leads to an antenna having dimensionally stable antenna elements.

With a core material having a substantially higher relative dielectric constant than that of air, e.g. $\in_r$=36, an antenna as described above for the DCS-1800 band in the region of 1710 MHz to 1880 MHz typically has a core diameter of about 10 mm and a core length in the axial direction (i.e. parallel to the central axis 12A) of about 12.1 mm. The aspect ratio of the axial length to the diameter of the core preferably lies within the range 1:1 to 2:1. For the DCS-1800 band, the length of the balun sleeve is typically in the region of 4.2 mm, the ratio of the axial extent of the sleeve to the combined axial extent of the sleeve and the antenna elements being in the range of from 0.25:1 to 0.5:1. In the case of the antenna elements and the sleeve together spanning the full length of the core between its two end surfaces, then, the axial length of the sleeve is typically between 0.25 L and 0.5 L, where L is the axial length of the core. The width of the conductor tracks is in the region of 0.75 to 1.25 mm, with 0.9 mm as a typical figure.

The 'saddle' region 44 of the operating bandwidth of the present embodiment represents an area of slightly reduced gain over a fraction of the bandwidth. As such, this region may be conveniently arranged to coincide with the guard band between transmit and receive channels in e.g. cellular telephone bands.

The small size of the antenna 10 renders it particularly suitable in handheld devices such as a mobile telephone handset and other personal communication devices. The plated balun sleeve 20 and/or the plated layer 22 on the proximal end face 12P of the core 12 allow the antenna to be directly mounted on a printed circuit board or other ground structure in a particularly secure manner. Typically, if the antenna is to be end-mounted, the proximal end face 12P can be soldered to a ground plane on the upper face of a printed circuit board with the inner feed conductor 18 passing directly through a plated hole in the board for soldering to a conductor track on the lower surface. Alternatively, sleeve 20 may be clamped or soldered to a printed circuit board ground plane extending parallel to the axis 12A, with the distal part of the antenna, bearing antenna elements 10A, 10B extending beyond an edge of the ground plane. It is possible to mount the antenna 10 either wholly within the handset unit, or partially projecting as shown in FIG. 7. The antenna of the present embodiment may be connected with a matched cable of 15Ω characteristic impedance.

What is claimed is:

1. An antenna for operation at frequencies in excess of 200 MHz comprising:

an insulative core of a solid material having a relative dielectric constant greater than 5, the outer surface of the core defining a volume the major part of which is occupied by the solid material;

a feeder structure comprising a length of transmission line;

an electrically conductive structure including a plurality of radiating elements connected to the transmission line at a first position, and a link element separately connecting the radiating elements to the transmission line at a second position, spaced from the first position along the feeder structure, the electrically conductive structure being disposed on or adjacent the outer surface of the core;

wherein the core and conductive structure are configured such that the antenna has at least two modes of resonance of differing types which are coupled thereby to define together an operating frequency band for signals fed to or received from the transmission line, said two modes of resonance of differing types I) occurring at different frequencies and being associated with different respective radio frequency (r.f.) current patterns in the conductive structure, each pattern including the said radiating elements and II) characterized by different overall conducting paths through which the r.f current flows over part of the conductive structure.

2. An antenna according to claim 1, wherein the input reactance component of the load represented by the antenna is substantially zero within the operating frequency band only when the corresponding input resistance component is finite and substantially non-zero.

3. An antenna according to claim 1, wherein the operating frequency band produced by the said coupled modes of resonance has a 3 dB bandwidth of at least 0.03 $f_c$, where $f_c$ is the centre frequency of the band, the 3 dB bandwidth being the frequency range over which the return loss, as hereinbefore defined, of the antenna differs by at least 3 dB with respect to the average out-of-band return loss.

4. An antenna for operation at frequencies in excess of 200 MHz comprising:
an insulative core of a solid material having a relative dielectric constant greater than 5, the outer surface of the core defining a volume the major part of which is occupied by the solid material;
a feeder structure comprising a length of transmission line;
an electrically conductive structure including a plurality of radiating elements connected to the transmission line at a first position, and a link element separately connecting the radiating elements to the transmission line at a second position, spaced from the first position along the feeder structure, the electrically conductive structure being disposed on or adjacent the outer surface of the core;
wherein the core and conductive structure are configured such that the antenna has at least two different modes of resonance which are coupled thereby to define together an operating frequency band for signal fed to or received from the transmission line, said two different modes of resonance occurring at different frequencies and being associated with different respective radio frequency (r.f.) current patterns in the conductive structure, each pattern including the said radiating elements, configured such that:
  (a) a first mode of resonance occurs at a first frequency within the said band and is associated with an r.f. current loop including the said radiating elements and beginning and ending at a location at which the radiating elements are connected to the transmission line at the first position, the link element acting as a high impedance blocking element at the first frequency, and such that
  (b) a second mode of resonance occurs at a second frequency within the said band and is associated with an r.f. current loop running from the location of the connection of the radiating elements to the transmission line at the first position, through the radiating elements and link element in series to the connection with the feeder structure at the second position.

5. An antenna for operation at frequencies in excess of 200 MHz comprising:
an insulative core of a solid material having a relative dielectric constant greater than 5, the outer surface of the core defining a volume to the major part of which is occupied by the solid material:
a feeder structure comprising a length of transmission line;
an electrically conductive structure including a plurality of radiating elements connected to the transmission line at a first position, and a link element separately connecting the radiating elements to the transmission line at a second position, spaced from the first position along the feeder structure, the electrically conductive structure being disposed on or adjacent the outer surface of the core;
wherein the core and conductive structure are configured such that the antenna has at lease two different modes of resonance which are coupled thereby to define together an operating frequency band for signals fed to or received from the transmission line, said two different modes of resonance occurring at different frequencies and being associated with different respective radio frequency current patterns in the conductive structure, each pattern including the said radiating elements:
wherein the modes of resonance include a balanced mode and a single-ended mode.

6. An antenna according to claim 5, wherein the first mode of resonance is the balanced mode and the second mode of resonance is the single-ended mode.

7. An antenna for operation at frequencies in excess of 200 MHz comprising:
an insulative core of a solid material having a relative dielectric constant greater than 5, the outer surface of the core defining a volume the major part of which is occupied by the solid material;
a feeder structure comprising a length of transmission line;
an electrically conductive structure including a plurality of radiating elements connected to the transmission line at a first position, and a link element separately connecting the radiating elements to the transmission line at a second position, spaced from the first position along the feeder structure, the electrically conductive structure being disposed on or adjacent the outer surface of the core;
wherein the core and conductive structure are configured such that the antenna has at least two different modes of resonance which are coupled hereby to define together an operating frequency band for signals fed to or received from the transmission line, said two different modes of resonance occurring at different fequencies and being associated with different respective radio frequency (r.f.) current patterns in the conductive structure, each pattern including the said radiating elements, wherein the core has a central axis and has distal and proximal end surfaces, the radiating elements comprise a plurality of axially coextensive conductors which, in the region of one end surface of the core, are connected to the transmission line and which extend to connections with the link element, the link element being directly or indirectly connected to the transmission line in the region of the other end surface of the core.

8. An antenna according to claim 7, wherein the transmission line extends through the core from one end surface to the other.

9. An antenna according to 7, configured such that the field component associated with the first mode of resonance is a voltage dipole oriented transversely of the central axis of the core, and the electric field component associated with the second mode of resonance is a voltage dipole oriented generally parallel to the central axis.

10. An antenna for operation at frequencies in excess of 200 MHz comprising:

an insulative core of a solid material having a relative dielectric constant greater than 5, the outer surface of the core defining a volume the major part of which is occupied by the solid material:

a feeder structure comprising a length of transmission line;

an electrically conductive structure including a plurality of radiating elements connected to the transmission line at a first position, and a link element separately connecting the radiating elements to the transmission line at a second position, spaced from the first position along the feeding structure, the electrically conductive structure being disposed on or adjacent the outer surface of the core;

wherein the core and conductive structure are configured such that the antenna has at least two different modes of resonance which are coupled thereby to define together an operating frequency band for signals fed to or received from the transmission line, said two different modes of resonance occurring at different frequencies and being associated with different respective radio frequency current patterns in the conductive structure, each pattern including the said radiating elements; wherein the core is cylindrical, and has distal and proximal end surfaces and a central axis, the radiating elements comprise a plurality of axially coextensive conductors which in the region of one end surface of the core, are connected to the transmission line and which extend to connections with the link element, and the link element is at least indirectly connected to the transmission line in the region of the other end surface of the core, the link element comprising a conductive sleeve extending over the cylindrical outer surface of the core from one end surface to a position intermediate the core end surfaces where it forms an annular sleeve rim, and wherein the antenna elements comprise a single pair of diametrically opposed elements each extending from a connection with the transmission line on the other end surface of the core to the rim of the sleeve, the ratio of the length of the core to its diameter being in the range of from 1:1 to 2:1.

11. An antenna according to claim 10, wherein the axial extent of the sleeve is in the range of from 0.25 L to 0.5 L, wherein L is the axial length of the core.

12. An antenna for operation at frequencies in excess of 200 MHz comprising:

an insulative core of a solid material en a relative dielectric constant greater than 5, the outer surface of the core defining a volume the major part of which is occupied by the solid material;

a feeder structure comprising a length of transmission line;

an electrically conductive structure including a plurality of radiating elements connected to the transmission line at a first position, and a link clement separately connecting the radiating elements to the transmission line at a second position, spaced from the first position along the feeder structure, the electrically conductive structure being disposed on or adjacent the outer surface of the core;

wherein the core and conductive structure are configured such that the antenna has at least two different modes of resonance which are coupled thereby to define together an operating frequency band for signals fed to or received from the transmission line, said two different modes of resonance occurring at different frequencies and being associated with different respective radio frequency (r.f.) current paten in the conductive structure, each pattern including the said radiating elements, wherein the link element is a balun trap, arranged to promote substantially balanced currents at the connection between the transmission line and the radiating elements at the said first position in one of the said modes.

13. An antenna for operation at frequencies in excess of 200 MHz comprising:

an insulative core of a solid material having a relative dielectric constant greater than 5, the outer surface of the core defining a volume the major part of which is occupied by the solid material;

a feeder structure comprising a length of transmission line;

an electrically conductive structure including a plurality of radiating elements connected to the transmission line at a first position, and a link element separately connecting the radiating elements to the transmission line at a second position, spaced from the first position along the feeder structure, the electrically conductive structure being disposed on or adjacent the outer surface of the core;

wherein the core and conductive structure are configured such that the antenna has at least two different modes of resonance which are coupled thereby to define together an operating frequency band for signals fed to or received from the transmission line, said two different modes of resonance occurring at different frequencies and being associated with different respective radio frequency (r.f.) current patterns in the conductive structure, each pattern including the said radiating elements, wherein the core has a central axis, the radiating elements comprise a single pair of axially coextensive helical conductors which are centred on the axis and appositely located with respect to each other about the axis, and the link element extends around the core and around the axis to interconnect the radiating elements at ends thereof opposite to their connection with the transmission line, and wherein the electrical lengths of the radiating elements and of the conductive path formed by the link element between the radiating elements and the second position on the transmission line are such that, within the said operating band, the antenna exhibits a first mode of resonance in which the link clement forms a quarter-wave trap and the pair of helical conductors form a resonant loop with currents of substantially opposite respective phases flowing in the said conductors adjacent their connections with the link element, and a second mode of resonance in which the pair of helical conductors and the link element form a resonant combination with currents of substantially equal phase flowing in the said conductors adjacent their connections with the link element and with the said currents flowing through the link element to the transmission line at the said second position, the two modes of resonance being coupled such that, between the respective associated resonant frequencies the return loss of the antenna within the operating frequency band measured at a termination of the transmission line differs by at least 3 dB with respect to the average out of band return loss.

14. An antenna according to claim 13, wherein this Smith chart representation of the load impedance presented by the antenna within the operating band has a looped self-intersecting locus.

15. An antenna according to claim 13, wherein the core is cylindrical, the helical conductors are of equal length and each execute a half-turn around the core between the axially spaced-apart position, and the link element comprises the combination of a conductive sleeve on the cylindrical outer surface of the core and a plated end surface of the core, and wherein the ratio of the length of the core to its diameter is in the range of from 1:1 to 2:1.

16. An antenna according to claim 15, wherein the transmission line passes axially through the core between the first and second positions.

17. An antenna according to claim 13, wherein the radiating elements are connected to the transmission line at the said first position by radial portions lying on a single diameter construction and the link element is connected to the screen conductor thereof at the said second position.

18. An antenna according to claim 17, wherein the transmission line is of coaxial construction and the link element is connected to the screen conductor thereof at the said second position.

19. An antenna for operation at frequencies in excess of 200 MHz comprising:
   an insulative core of a solid material having a relative dielectric constant greater than 5, the outer surface of the core defining a volume the major part of which is occupied by the solid material;
   a feeder structure comprising a length of transmission line;
   an electrically conductive structure including a plurality of radiating elements connected to the transmission line at a first position, and a link element separately connecting the radiating elements to the transmission line at a second position, spaced from the first position along the feeder structure, the electrically conductive structure being disposed on or adjacent the outer surface of the core;
   wherein the core and conductive structure are configured such that the antenna has at least two different modes of resonance which are coupled thereby to define together an operating frequency band for signals fed to or received from the transmission line, said two different modes of resonance occurring at different frequencies and being associated with different respective radio frequency (r.f.) current patterns in the conductive structure, each pattern including the said radiating elements, wherein die radiating elements and the link element form a loop having a pair of side portions, and cross portions which extend between each of the said side portions, the ends of the side portions defining the corners of a notional rectangle, one of the cross portions containing a feed connection between the radiating elements and the transmission line.

20. An antenna according to claim 19, wherein between their ends, the side portions extend on opposite sides of the plane of the rectangle.

21. An antenna for operation at frequencies in excess of 200 MHz comprising:
   an insulative core of a solid material having a relative dielectric constant greater than 5, the outer surface of the core defining a volume the major part of which is occupied by the solid material;
   a feeder structure comprising a length of transmission line;
   an electrically conductive structure including a plurality of radiating elements connected to the transmission line at a first position, and a link element separately connecting the radiating elements to the transmission line at a second position spaced from the first position along the feeder structure, the electrically conductive structure being disposed on or adjacent the outer surface of the core;
   wherein the core and conductive structure are configured such that the antenna has at least two different modes of resonance which are coupled thereby to define together an operating frequency band for signal fed to or received from the transmission line, said two different modes of resonance occurring at different frequencies and being associated with different respective radio frequency (r.f.) current patterns in the conductive structure, each pattern including the said radiating elements, wherein the radiating elements and the link element together form, in one of the said modes of resonance, a loop having an electrical length of 360°.

22. An antenna according to claim 21, wherein the loop is twisted.

23. A handheld radio communication unit having a radio transceiver, an integral earphone for directing sound energy from an inner face of the unit which, in use, is placed against the user's ear, and an antenna comprising:
   an insulative core of a solid material having a relative dielectric constant greater than 5, the outer surface of the core defining a volume the major part of which is occupied by the solid material:
   a feeder structure comprising a length of transmission line;
   an electrically conductive structure including a plurality of radiating elements connected to the transmission line at a first position, and a link element separately connecting the radiating elements to the transmission line at a second position, spaced from the first position along the feeder structure, the electrically conductive structure being disposed on or adjacent the outer surface of the core;
   wherein the core and conductive structure are configured such that file antenna has at least two different modes of resonance which are coupled thereby to define together an operating frequency band for signals fed to or received from the transmission line, said two different modes of resonance occurring at different frequencies and being associated with different respective radio frequency current patterns in the conductive structure, each pattern including the said radiating elements,
   wherein the antenna is coupled to the transceiver,
   wherein the antenna has a central axis of symmetry and the said first and second positions on the transmission line are spaced apart along the axis, and wherein, over at least part of the operating frequency band, the antenna has a radiation pattern which, in a plane passing through the core normally to the axis, is substantiafly omnidirectional with the exception of a null, the antenna being so mounted that the axis of the antenna is generally parallel to the said inner face of said unit and with the null directed generally perpendicularly to the inner face of the unit and, in use of the unit, towards the user's head.

24. A radio communication unit according to claim 23, wherein the antenna core is in the form of a cylinder, the central axis of which is substantially parallel to said inner face in the region of the earphone, and wherein the radiation elements extend between a pair of axially spaced-apart positions on the core with the radiating element ends at each such position being substantially opposite each other and lying in a plane which contains the central axis and is generally parallel to the inner face of the unit.

25. A communication unit according to claim 24, wherein the antenna elements are helical, each executing a half turn about the central axis, and the link element comprises a conductive sleeve encircling the cylinder to form an isolating trip in one of the resonant modes in the operating frequency band of the antenna.

26. A handheld radio communication unit having a radio transceiver and an antenna comprising:

an insulative coro of a solid material having relative dielectric constant greater than 5, the outer surface of the core defining a volume the major part of which is occupied by the solid material;

a feeder structure comprising a length of transmission line;

an electrically conductive structure including a plurality of radiating elements connected to the transmission line at a first position, and a link element separately connecting the radiating elements to the transmission line at a second position, spaced from the first position along the feeder structure, the electrically conductive structure being disposed on or adjacent the outer surface of the core;

wherein the core and conductive structure are configured such that the antenna has at least two modes of resonance of differing types which are coupled thereby to define together an operating frequency band for signals fed to or received from the transmission line, said two modes of resonance of differing types I) occurring at different frequencies and being associated with different respective radio frequency current patterns in the conductive structure, each pattern including the said radiating elements and II) characterized by different overall conducting paths through which the r.f. current flows over part of the conductive structure, the antenna being coupled to the transceiver, wherein the transceiver has a transmitting band portion and a receiving band portion which are different but adjacent each other within the said operating frequency band of the antenna.

27. A communication unit according to claim 26, wherein the transmitting and receiving band portions are separated by a guard band and the centre frequency of the antenna operating frequency band substantially coincides with the guard band.

* * * * *